(12) United States Patent
Stevens et al.

(10) Patent No.: US 8,567,846 B1
(45) Date of Patent: Oct. 29, 2013

(54) VEHICLE HAVING UTILITY BED INCLUDING SEAT

(75) Inventors: Eric B. Stevens, Columbus, OH (US); Casey Heit, Marysville, OH (US); Christopher M. Krajewski, Dublin, OH (US); Yoshiyuki Sato, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/480,025

(22) Filed: May 24, 2012

(51) Int. Cl.
*B62D 33/02* (2006.01)

(52) U.S. Cl.
USPC .......... 296/183.1; 296/64; 296/66; 296/65.09

(58) Field of Classification Search
USPC ......... 296/183.1, 183.2, 64, 66, 65.05, 65.09, 296/69; 297/129, 378.1
See application file for complete search history.

(56) References Cited

U.S. PATENT DOCUMENTS

| | | | |
|---|---|---|---|
| 1,732,116 A | 10/1929 | Boller | |
| 3,761,124 A | 9/1973 | Weik et al. | |
| 4,534,593 A | 8/1985 | Ojala | |
| 4,756,573 A | 7/1988 | Simin et al. | |
| 4,880,264 A | 11/1989 | Yamazaki et al. | |
| 5,106,158 A | 4/1992 | Dukatz et al. | |
| 5,332,284 A | 7/1994 | Elton et al. | |
| 5,342,109 A | 8/1994 | Berry et al. | |
| 5,913,570 A * | 6/1999 | Yoshida et al. | 297/378.14 |
| 6,076,880 A | 6/2000 | Coffer et al. | |
| 6,082,815 A | 7/2000 | Xiromeritis et al. | |
| 6,386,629 B1 | 5/2002 | Severinski et al. | |
| 6,837,531 B2 | 1/2005 | Mack et al. | |
| 8,215,690 B2 * | 7/2012 | Nishiike et al. | 296/24.43 |
| 2007/0114819 A1 | 5/2007 | Dougherty | |
| 2009/0256388 A1* | 10/2009 | Tanaka et al. | 296/186.4 |
| 2011/0148145 A1* | 6/2011 | Nishiike et al. | 296/182.1 |

OTHER PUBLICATIONS

International Search Report and Written Opinion of the International Searching Authority, issued in International Application No. PCT/US13/34368, dated May 7, 2013; 9 pages in its entirety.

* cited by examiner

*Primary Examiner* — Jason S Morrow
(74) *Attorney, Agent, or Firm* — Ulmer & Berne LLP

(57) ABSTRACT

A vehicle includes a vehicular frame and a utility bed coupled with the vehicular frame. The utility bed includes a bed frame and a seat. The seat includes a seat bottom and a seat back. The seat back is movable between a stowed position and a deployed position. The seat back includes an upper back support and a lower back support. The lower back support is movably coupled with the upper back support and is movable between a passenger support position and a stored position.

20 Claims, 7 Drawing Sheets

VEHICLE HAVING UTILITY BED INCLUDING SEAT

TECHNICAL FIELD

A vehicle includes a vehicular frame and a utility bed. The utility bed is coupled with the vehicular frame and includes a left rear seat and a right rear seat.

BACKGROUND

Certain conventional vehicles include a utility bed which is movable between a hauling position and a dumping position. Such a utility bed is often referred to as a "dump bed" and is suitable to selectively facilitate transportation of cargo.

SUMMARY

In accordance with one embodiment, a vehicle comprises a vehicular frame and a utility bed coupled with the vehicular frame. The utility bed comprises a bed frame and a seat. The seat comprises a seat bottom and a seat back. The seat back is movable between a stowed position and a deployed position. The seat back comprises an upper back support and a lower back support. The lower back support is movably coupled with the upper back support and is movable between a passenger support position and a stored position. Movement of the lower back support to the stored position reveals a space adjacent to the upper back support that is occupied by the seat bottom when the seat back is moved to the stowed position.

In accordance with another embodiment, a vehicle comprises a vehicular frame a utility bed coupled with the vehicular frame. The utility bed comprises a bed frame and a seat. The seat comprises a seat bottom and a seat back. The seat back is movable between a stowed position and a deployed position. The seat back comprises an upper back support and defines a space adjacent to the upper back support. The lower back support is pivotally coupled with the upper back support and is pivotable between a passenger support position and a stored position. When the lower back support is pivoted from the passenger support position into the stored position, the lower back support moves upwardly and away from the seat bottom.

In accordance with yet another embodiment, a vehicle comprises a vehicular frame a utility bed coupled with the vehicular frame. The utility bed comprises a bed frame, a left seat, a right seat, a left door, a left side wall, a right door, and a right side wall. The left seat comprises a left seat bottom and a left seat back. The left seat back is pivotally coupled to the left seat bottom and is pivotable between a stowed position and a deployed position. The left seat back comprises a left upper back support and a left lower back support. The left lower back support is pivotally coupled with the left upper back support and is pivotable between a passenger support position and a stored position. The right seat comprises a right seat bottom and a right seat back. The right seat back is pivotally coupled to the right seat bottom and is pivotable between a stowed position and a deployed position. The right seat back comprises a right upper back support and a right lower back support. The right lower back support is pivotally coupled with the right upper back support and is pivotable between a passenger support position and a stored position. The left door is pivotally coupled with the bed frame and is pivotable between an opened position and a closed position. The right door is pivotally coupled with the bed frame and is pivotable between an opened position and a closed position. Movement of the left lower back support to the stored position reveals a space adjacent to the left upper back support that is occupied by the left seat bottom when the left seat back is moved to the stowed position. Movement of the right lower back support to the stored position reveals a space adjacent to the right upper back support that is occupied by the right seat bottom when the left seat back is moved to the stowed position.

BRIEF DESCRIPTION OF THE DRAWINGS

Various embodiments will become better understood with regard to the following description, appended claims and accompanying drawings wherein:

DETAILED DESCRIPTION

Embodiments are hereinafter described in detail in connection with the views of FIGS. 1-8, wherein like numbers indicate the same or corresponding elements throughout the views. A utility vehicle includes a utility bed which can be used to facilitate hauling of cargo by the utility vehicle. In one embodiment, the utility vehicle can be a dump-type utility vehicle having a utility bed that can facilitate selective dumping of cargo from the utility bed. A dump-type utility vehicle can comprise a light utility vehicle, such as the utility vehicle 10 shown in FIGS. 1-8. In other embodiments, a dump-type utility vehicle can comprise any of a variety of other types of utility vehicles having a utility bed capable of dumping (e.g., a dump bed) such as, for example, a pickup truck, a dump truck, an all terrain vehicle ("ATV"), and a golf cart, for example. In another embodiment, the utility vehicle can include a non-dump type utility vehicle having a utility bed that is rigidly fixed to the utility vehicle's frame (e.g., a non-dumpable bed). In yet another embodiment, the utility vehicle can include a trailer.

Figure 1:
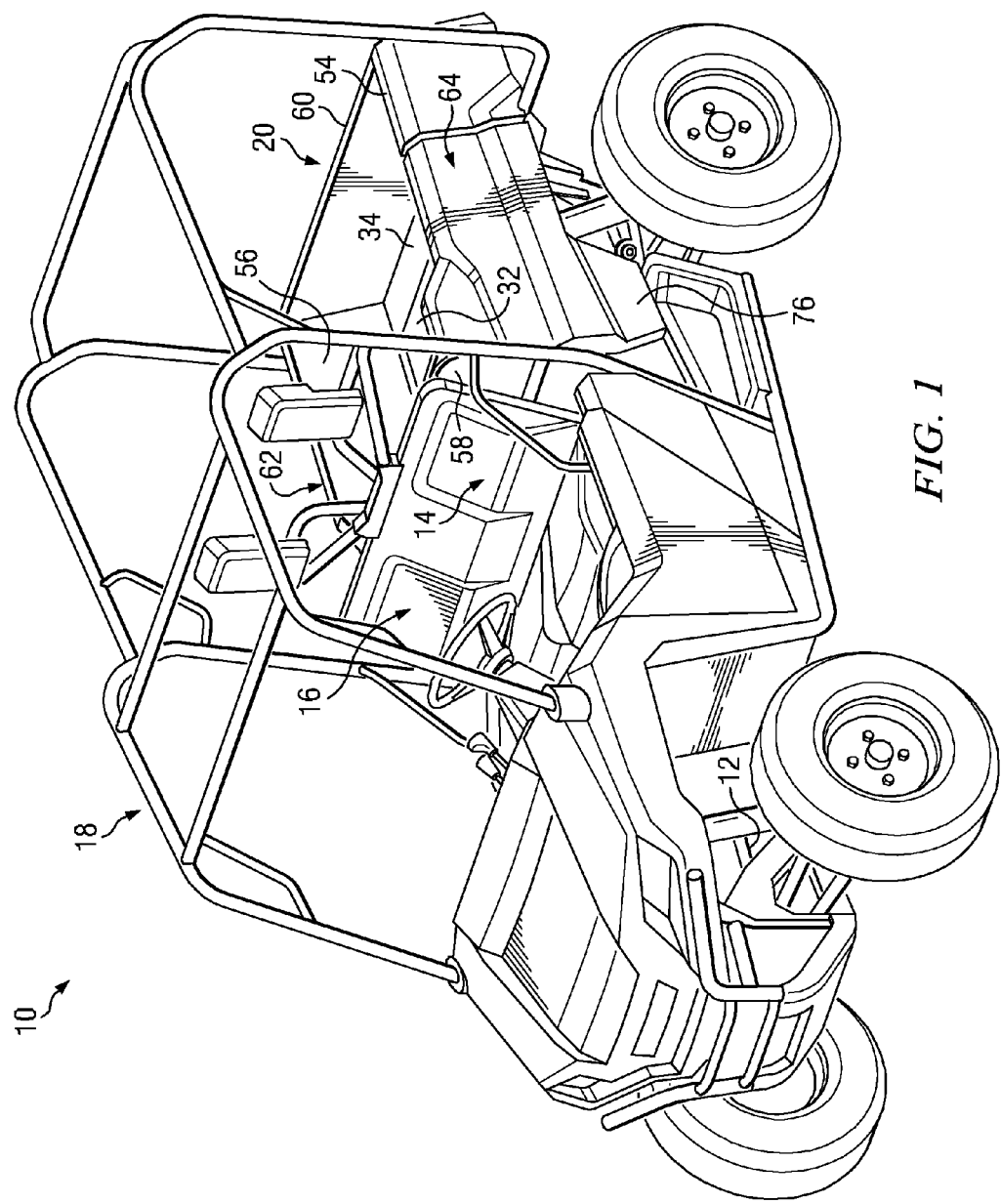
FIG. 1 is a left front perspective view depicting a vehicle having a utility bed that includes a left door, a right door, a left rear seat, and a right rear seat, in accordance with one embodiment.

Referring to FIG. 1, the utility vehicle 10 can include a vehicular frame 12. The vehicular frame 12 can include any of a variety of structural and/or decorative rails, panels, and/or other components which are typically, although not necessarily, formed from metal (e.g., steel and/or aluminum). A left front seat 14 and a right front seat 16 can each be supported by the vehicular frame 12 and can facilitate support of occupants within a passenger compartment 18. The utility vehicle 10 can also include a utility bed 20 which is coupled with the vehicular frame 12, either directly or indirectly, and such as through use of a hinge assembly (not shown). The hinge assembly can facilitate pivotable movement of the utility bed 20 with respect to the vehicular frame 12, and between a hauling position (shown in FIG. 1) and a dumping position (not shown).

Figure 2:
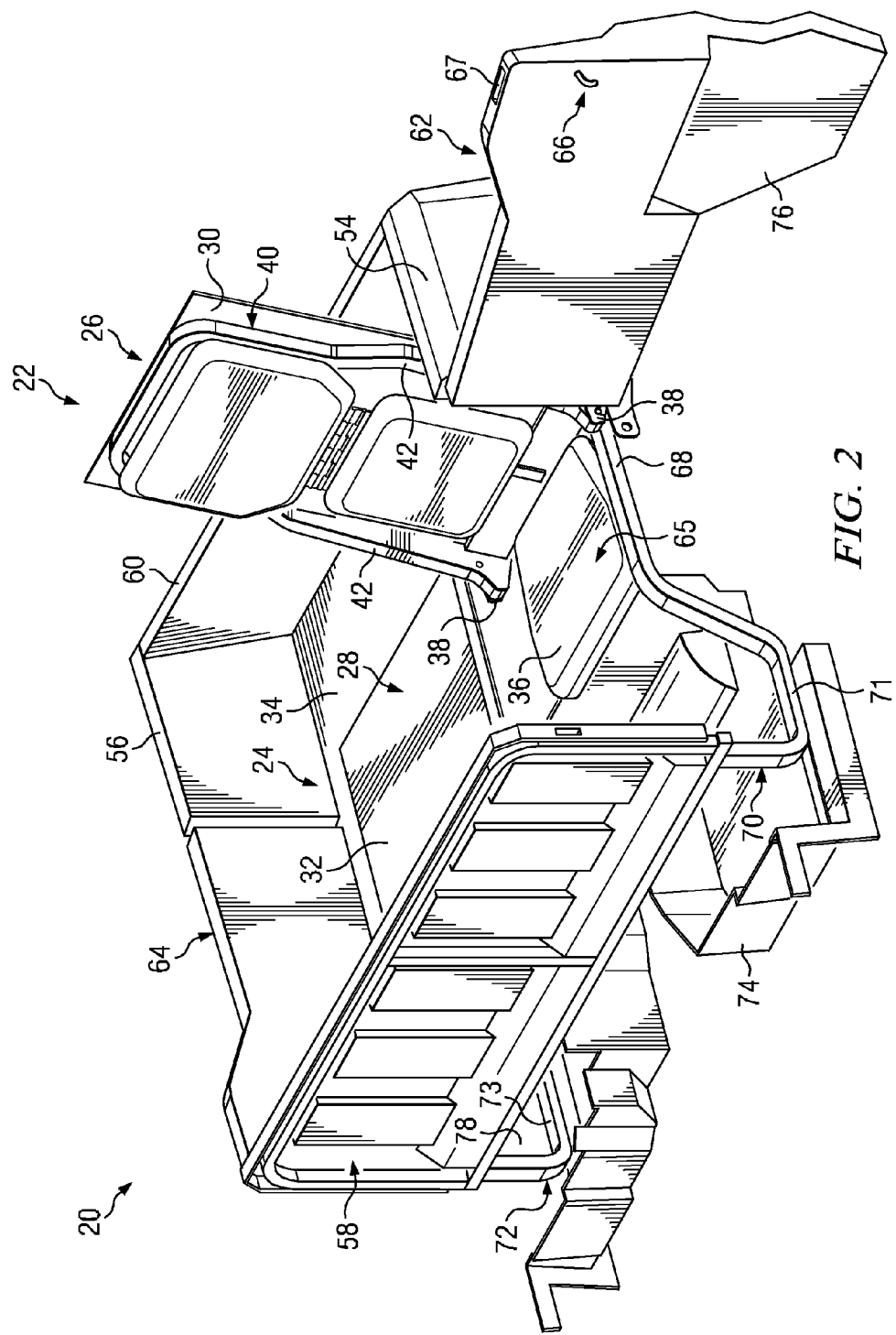
FIG. 2 is a left front perspective view depicting the utility bed and other various components of the vehicle of FIG. 1, wherein the left door is shown in an opened position, the left rear seat includes a left seat back that includes an upper back support and a lower back support, and the left seat back is shown in a deployed position with the lower back support in a passenger support position.

As illustrated in FIGS. 1 and 2, the utility bed 20 can include a left rear seat 22 and a right rear seat 24 that can include a left seat back 26 and a right seat back 28, respectively. Each of the left and right seat backs 26, 28 are selectively and independently movable between a stowed position (shown with respect to the left and right rear seats 22, 24 in FIG. 1) and a deployed position (shown with respect to the left rear seat 22 in FIG. 2). When the left and right seat backs 26, 28 are in their stowed positions, their respective cover panels 30, 32 can facilitate support of cargo within the utility bed 20. For example, the utility bed 20 is shown to comprise a bed floor 34 adjacent to the left and right seats 22, 24. When the left and right seat backs 26, 28 are in their respective stowed positions, the left and right cover panels 30, 32 can cooperate with the bed floor 34 to define a cargo support surface for the utility bed 20. When the left and right seat backs 26, 28 are in their deployed positions, the left and right seat backs 26, 28 can cooperate with respective left and right seat bottoms (e.g., left seat bottom 36 shown in FIGS. 2-3) to facilitate support of passengers behind the left front seat 14 and the right front seat 16, respectively. The left and right seat bottoms (e.g., 36) can include respective cushions for providing underlying support to a seated passenger.

Figure 3:
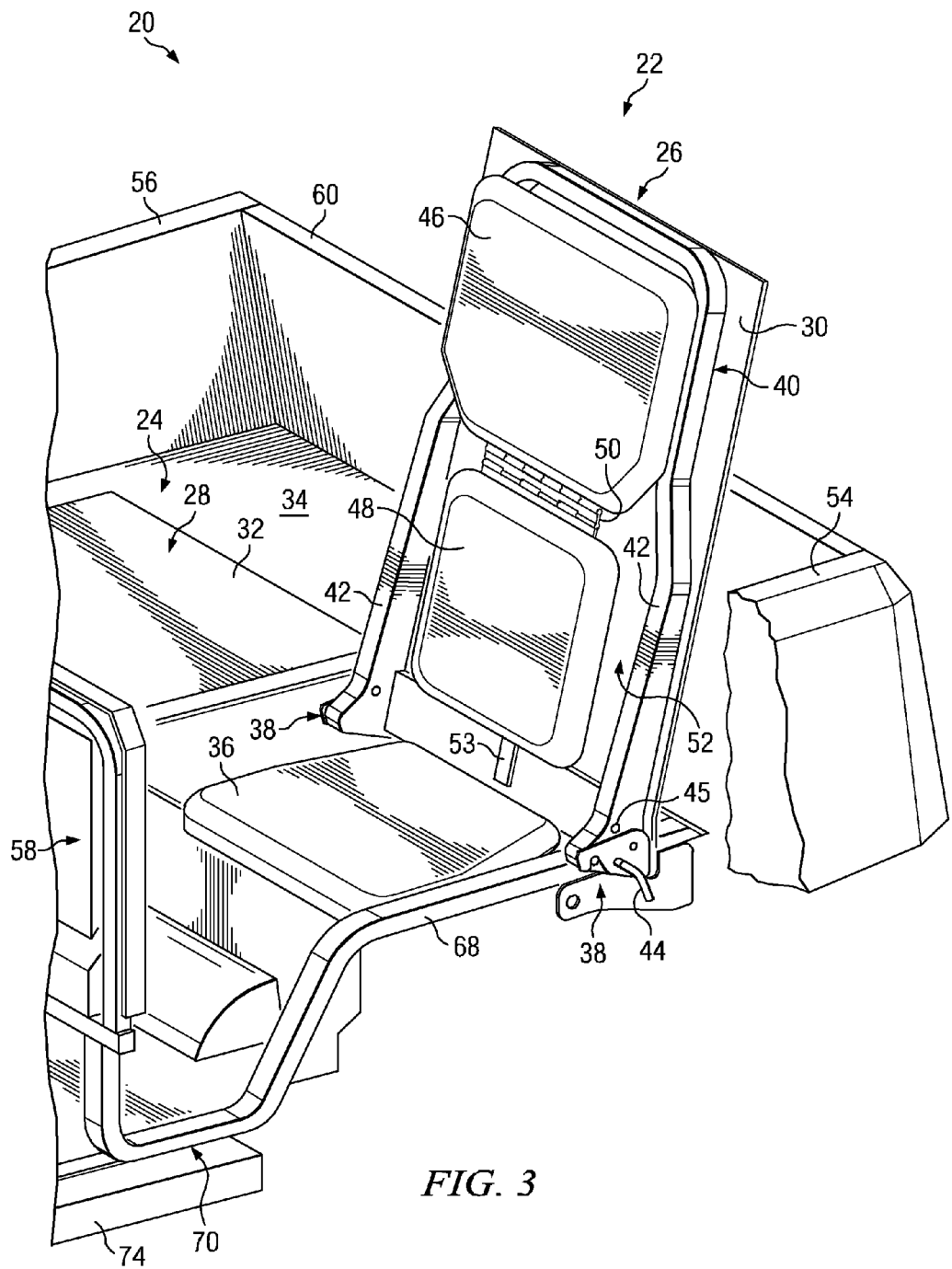
FIG. 3 is an enlarged view depicting various components of the utility bed of FIG. 1, wherein the left seat back is shown in the deployed position with a portion of a left side wall shown cutaway for clarity of illustration.

In one embodiment, as illustrated in FIGS. 2 and 3, the left seat back 26 can be pivotally coupled to the left seat bottom 36 by a pair of back hinges 38 such that the left seat back 26 is pivotable between the stowed position and the deployed position. In other embodiments, a left seat back can be movably coupled with a left seat bottom in any of a variety of suitable alternative arrangements. The left seat back 26 is shown to include a seat back frame 40 having a pair of upright members 42. The back hinges 38 can be coupled with respective ones of the upright members 42 (e.g., through welding). One of the back hinges 38 can include a locking member 44 that can facilitate selective retention of the left seat back 26 in either the deployed or stowed positions. When the left seat back 26 is in either the deployed or stowed position, the locking member 44 can project into an aperture (e.g., 45 in FIG. 3) defined by the upright member 42 to lock the left seat back 26 in place. To release the left seat back 26, the locking member 44 can be pulled away from the left seat back 26 to retract it from the aperture (e.g., 45) and allow the left seat back 26 to move (e.g., manually) between the deployed and stowed positions. A spring (not shown) can be associated with the locking member 44 to automatically insert the locking member 44 into the aperture (e.g., 45) when the left seat back 26 reaches the stowed or deployed position.

As illustrated in FIG. 3, the left seat back 26 can include an upper back support 46 and a lower back support 48. The upper back support 46 can be coupled with the seat back frame 40, such as with releasable fasteners or through welding, for example. The upper back support 46 is shown to overlie the seat back frame 40 such that the seat back frame 40 is sandwiched between the upper back support 46 and the left cover panel 30. The lower back support 48 can be pivotally coupled to the upper back support 46 through use of a back support hinge 50 and can be pivotable with respect to the upper back support 46 between a passenger support position (illustrated in FIGS. 2 and 3) and a stored position (illustrated in FIG. 4). When the lower back support 48 is in the passenger support position, the upper and lower back supports 46, 48 can cooperate to provide support for a back of a passenger seated on the left rear seat 22. As illustrated in FIG. 3, the upright members 42 can extend alongside the lower back support 48 such that, when the lower back support 48 is in the passenger support position, the lower back support 48 occupies a space 52 defined between the upright members 42. It will be appreciated that the thickness of the upper and lower back supports 46, 48 can be selected to have sufficient thickness to prevent the passenger's back from contacting the upright members 42 when a passenger is seated on the left rear seat 22.

Figure 4:
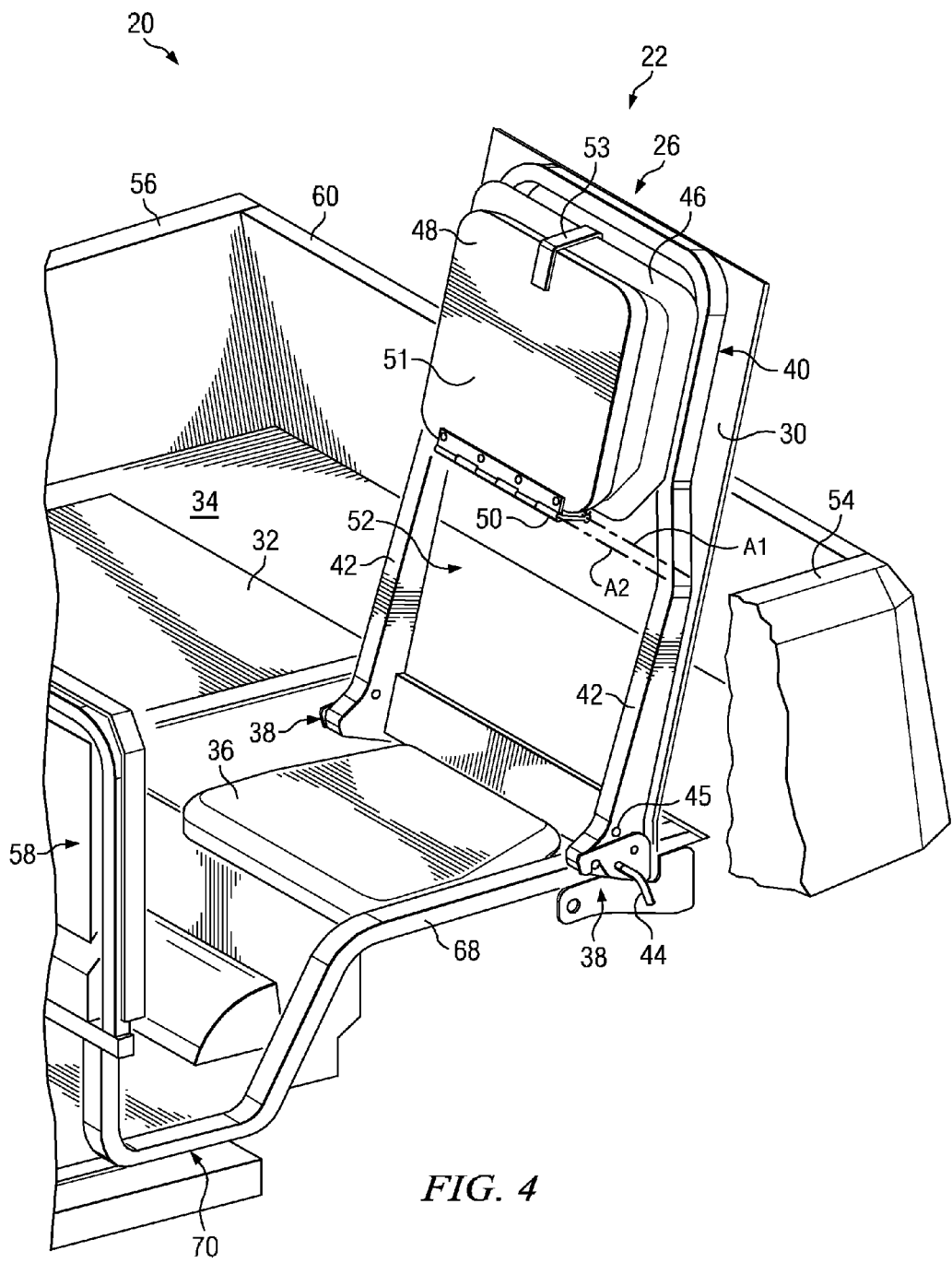
FIG. 4 is an enlarged view depicting the left rear seat similar to FIG. 3 but with the lower back support of the left rear seat in a stored position.
Figure 5:
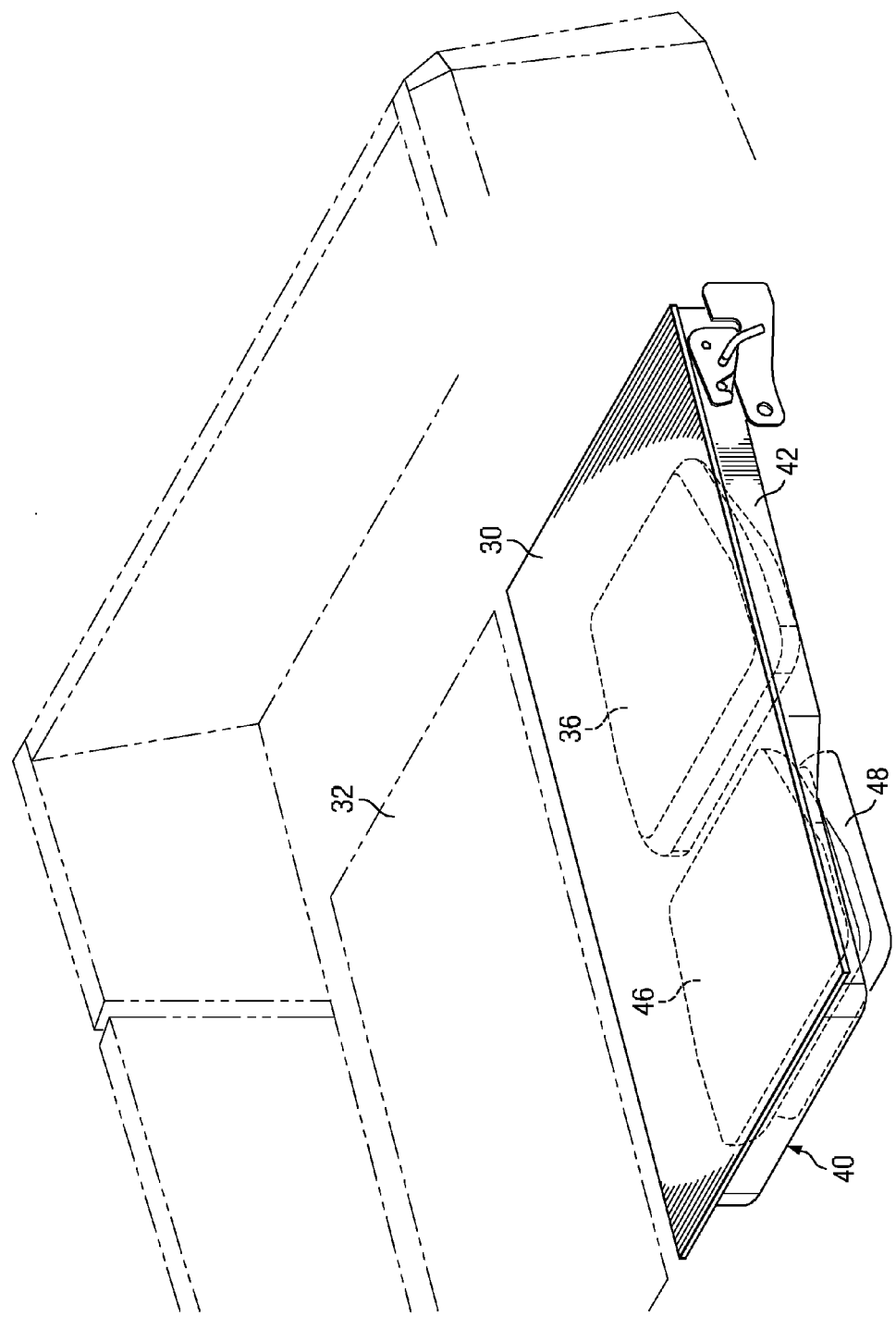
FIG. 5 is an enlarged view depicting the left rear seat similar to FIG. 4 but with the left rear seat in a stowed position.

To move the lower back support 48 to the stored position, it can be pivoted upwardly and away from the left seat bottom 36. When the lower back support 48 is in the stored position, as illustrated in FIG. 4 the upper and lower back supports 46, 48 can be sandwiched together such that the space 52 is no longer occupied by the lower back support 48. When the left seat back 26 is then moved into the stowed position, as illustrated in FIG. 5, the left seat bottom 36 can occupy the space 52. By moving the lower back support 48 out of the way of the left seat bottom 36, the lower back support 48 does not become sandwiched between the left cover panel 30 and the left seat bottom 36 but is instead provided in a foot well in front of the left seat bottom 36 which can reduce the risk of the left seat bottom 36 and/or lower back support 48 becoming deformed when the left seat back 26 is in the stored position for an extended period of time. In addition, the left seat 22 can require less vertical space beneath the utility bed than conventional folding seat arrangements thereby reducing the effect to the overall vertical height of the utility bed 20 and/or the overall center of gravity of the utility vehicle 20. It will also be appreciated that by moving the lower back support 48 out of the space 52 to accommodate the left seat bottom 36, the thickness of lower back support 48 can be selected to be thicker (i.e., more comfortable) than some conventional folding seat arrangements since the lower back support 48 is not constrained to fit within the area between the left cover panel 30 and the left seat bottom 36.

Figures 6, 7:
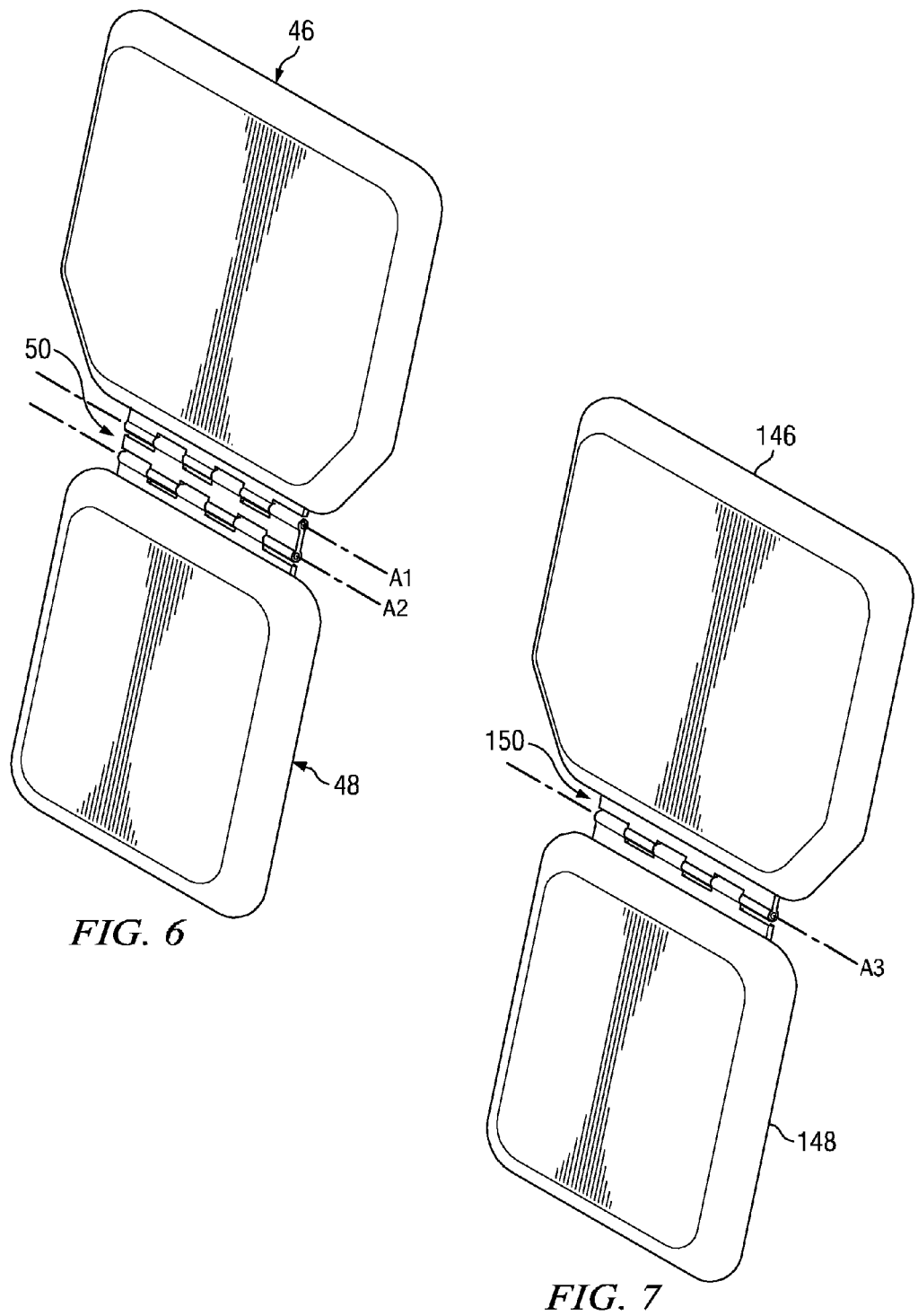
FIG. 6 is an enlarged view depicting the upper back support and the lower back support of the left rear seat of FIG. 2, according to one embodiment, apart from the rest of the vehicle and shown coupled together with a back support hinge, according to one embodiment.
FIG. 7 is an enlarged view depicting an upper back support and a lower back support of a left rear seat, according to another embodiment, apart from the rest of the vehicle and coupled together with a back support hinge, according to another embodiment.

In one embodiment, as illustrated in FIGS. 2, 3, and 6, the back support hinge 50 can comprise a double hinge that defines first and second pivot axes A1, A2. The lower back support 48 can be selectively pivoted about each of the first and second pivot axes A1, A2 during movement of the lower back support 48 between the passenger support and stored positions. The double hinge can be secured to respective rear surfaces (e.g., 51 shown in FIG. 4 with respect to the lower back support 48) of the upper and lower back supports 46, 48. When the lower back support 48 is moved into the stored position, the back support hinge 50 can be folded into a substantially U-shaped arrangement that accommodates the thicknesses of the upper and lower back supports 46, 48 and permits the upper and lower back supports 46, 48 to be sandwiched together (e.g., substantially parallel with each other). When the lower back support 48 is in the passenger support position, the back support hinge 50 can rest against the left cover panel 30 and can be substantially concealed by the upper and lower back supports 46, 48, thus contributing to the overall aesthetics of the left rear seat 22.

The lower back support 48 is shown in FIGS. 2-4 to include a strap 53. When the lower back support 48 is in the passenger support position, the strap 53 can hang freely from the lower back support 48. A user can grasp and pull the strap 53 upwardly to move the lower back support 48 into the stored position. When the lower back support 48 is in the stored position, the strap 53 can be releasably secured of the upper back support 46 to prevent the lower back support 48 from inadvertently returning to the passenger support position. In one embodiment, the strap 53 can be releasably coupled to the upper back support 46, or any of a variety of other suitable components or locations of the left seat back 26, through use of a hook and loop fastener arrangement, a hook and closure arrangement, a releasable fastener, or any of a variety of suitable alternative fastening arrangements.

In one embodiment, the left seat bottom 36, the upper back support 46, and/or the lower back support 48 can comprise a cushion that is formed from polyurethane foam and covered with a suitable material, such as vinyl, for example. It will be appreciated in other embodiments, the left seat bottom, the upper back support, and/or the lower back support can be formed from any of a variety of other suitable alternative compressible materials or can be formed from rigid or semi-rigid materials such as thermoplastic, for example.

It will be appreciated that the right rear seat 24 can be similar in many respects to the left rear seat 22, but instead disposed upon a right side of the utility bed 20 for seating of a passenger behind the right front seat 16. For example, the right rear seat 24 can include a pair of back hinges (not shown) that pivotally couple the right seat back 28 with a right rear seat bottom. The right seat back 28 can include a lower back support (not shown) that is pivotally coupled with a upper back support (not shown) and is pivotal into a stored position to reveal a space adjacent to the upper back support that is occupied by the right seat bottom when the right seat back 28 is moved to the stowed position.

Referring to FIGS. 2-4, the utility bed 20 is shown to include a left side wall 54 and a right side wall 56 extending generally perpendicularly from the bed floor 34 or locations adjacent to the bed floor 34. The utility bed 20 is also shown to include a front wall 58 and a tailgate 60. The tailgate 60 can be pivotally coupled with respect to the bed floor 34. When the utility bed 20 is in the hauling position (shown in FIG. 1), the left side wall 54, the right side wall 56, and the front wall 58 can cooperate with the bed floor 34 to retain cargo within the utility bed 20. The tailgate 60, when closed (as shown in FIGS. 1 and 2), can also cooperate with the left side wall 54, the right side wall 56, and the bed floor 34 to retain cargo within the utility bed 20. It will be appreciated that the tailgate 60 can be selectively opened to facilitate loading of the utility bed 20 and/or to allow cargo (e.g., dirt) to pour from the utility bed 20 when the utility bed 20 is in a dumping position (not shown). In another embodiment, it will be appreciated that a rear wall can be provided in lieu of a tailgate with the rear wall being rigidly affixed with respect to a bed floor of a utility bed such that it might not be capable of being selectively opened by an operator. In yet another alternative embodiment, it will be appreciated that one or more side walls (e.g., 54 and/or 56) of a utility bed might be capable of being selectively opened (e.g., like tailgate 60) by an operator. In still another alternative embodiment, it will be appreciated that a utility bed might not include any tailgate and/or side walls and might, for example, comprise a flat-bed type configuration (e.g., commonly used for hauling small utility vehicles).

The utility bed 20 is also shown in FIG. 2 to include respective left and right doors 62, 64 which are each pivotable between a closed position (shown with respect to the right door 64 in FIG. 2) and an opened position (shown with respect to the left door 62 in FIG. 2). When in the closed position, each of the left and right doors 62, 64 can cooperate with the left and right sidewalls 54, 56, the front wall 58, and the bed for 34 to retain cargo within the utility bed 20. When the left and right doors 62, 64 are moved to the opened position, left and right openings (e.g., 65) can be defined and can provide a passenger ingress/egress to/from the left and right rear seats 22, 24.

In one embodiment, the left and right doors 62, 64 can comprise rear-hinged doors that are pivotally attached to the left and right side walls 54, 56, respectively, such that the left and right doors 62, 64 can be selectively opened towards a rear of the utility bed 20. Opening the left and right doors 62, 64 towards the rear of the utility bed 20 can permit more direct access to the left and right rear seats 22, 24 than might be otherwise be available with front-hinged doors. It will be appreciated, however, that in certain embodiments, the left and right doors 62, 64 are contemplated to be front-hinged doors or any of a variety of suitable alternate door arrangements.

Each of the left and right doors 62, 64 can include respective left and right door latches (e.g., 66) that can selectively interact with the front wall 58 to facilitate releasable coupling of the left and right doors 62, 64 in their closed positions. The latches (e.g., 66) can be selectively activated through operation of a handle (e.g., 67) to facilitate opening of the left and right doors 62, 64. In one embodiment, a seal (not shown) can be provided along the perimeter of each of the left and right doors 62, 64. Each seal can facilitate selective sealing of the interaction between the door (e.g., 62, 64) and the adjacent side wall (e.g., 54, 56).

As illustrated in FIGS. 1-3, the utility bed 20 can include a bed frame 68 that is configured to provide underlying and structural support for certain components of the utility bed 20. The bed frame 68 can comprise a tubular frame structure that extends along a perimeter and/or underneath the bed floor 34 and provides underlying support for the bed floor 34, the left and right side walls 54, 56, and/or the front wall 58. The bed frame 68 can include left and right foot portions 70, 72 that are provided adjacent a foot well for the left and right seats 22, 24. The utility bed 20 can include a foot well tray 74 that underlies the bed frame 68 and extends between the left and right foot portions 70, 72 of the bed frame 68. The foot well tray 74 can define at least part of the foot well. The left and right foot portions 70, 72 can be substantially U-shaped to provide an effective pass-through for a passenger's feet when accessing the left and right seats 22, 24. When a passenger is seated in the left seat 22 and/or the right seat 24, the passenger can rest her feet upon the foot well tray 74. The foot well tray 74 can protect the passenger from being contacted by debris during operation of the utility vehicle 10 and can also protect debris from contacting and/or collecting on the left and right rear seats 22, 24 when the left and right rear seats 22, 24 are unoccupied.

The left and right foot portions 70, 72 can include respective lateral members 71, 73. When a passenger enters/exits one of the left and right rear seats 22, 24, the passenger can step onto the lateral member (e.g., 71, 73) such that at least some of the passenger's weight is borne by the bed frame 68. The foot well tray 74 can underlie the left and right foot portions 70, 72 such that the weight of a passenger stepping on the lateral members 71, 73 can be additionally borne by the foot well tray 74. The left and right foot portions 70, 72 and/or the foot well tray 74 can be provided with an anti-skid surface or other suitable material (not shown) that can improve the overall effective footing for a passenger. In some embodiments, the foot well tray 74 can be secured directly to the vehicular frame 12 while in other embodiments, the foot well tray 74 can be secured to the utility bed 20 such that the foot well tray 74 moves together with utility bed 20 during pivoting between the hauling and dumping positions. It will be appreciated that a bed frame can be provided in any of a variety of suitable alternative arrangements. For example, a bed frame might be integrally formed as part of a bed floor such as in a one-piece bed floor/bed frame configuration.

As illustrated in FIG. 2, the left and right doors 62, 64 can include respective lower wing portions 76, 78 that have substantially the same general overall shape as the left and right foot portions 70, 72, respectively. When the left and right doors 62, 64 are in their closed positions, the respective lower wing portions 76, 78 can prevent a passenger's feet from inadvertently leaving the foot well, such as during a sharp turn or during traversal of uneven terrain, for example. The lower wing portions 76, 78 can also conceal the left and right foot portions 70, 72 when the left and right doors 62, 64 are closed which can contribute to the overall aesthetics of the utility bed 20.

Referring now to FIG. 7, an upper back support 146 and lower back support 148 are illustrated according to another embodiment. The upper and lower back supports 146, 148 can be similar to, or the same in many respects to the upper and lower back supports 46, 48, respectively, shown in FIGS. 1-6. For example, the upper back support 146 and lower back support 148 can be pivotally coupled together with a back support hinge 150, according to another embodiment. The back support hinge 150, however, can comprise a single hinge that is secured to upper and lower back supports 146, 148 and defines a single pivot axis A3 for the lower back support 148. With the single hinge, thicknesses of the upper and lower back supports 146, 148 might prevent the upper and lower back supports 146, 148 from being completely sandwiched together. Instead, the upper and lower back supports 146, 148 can be provided in a substantially v-shaped formation when the lower back support 148 is in the stored position.

Figure 8:
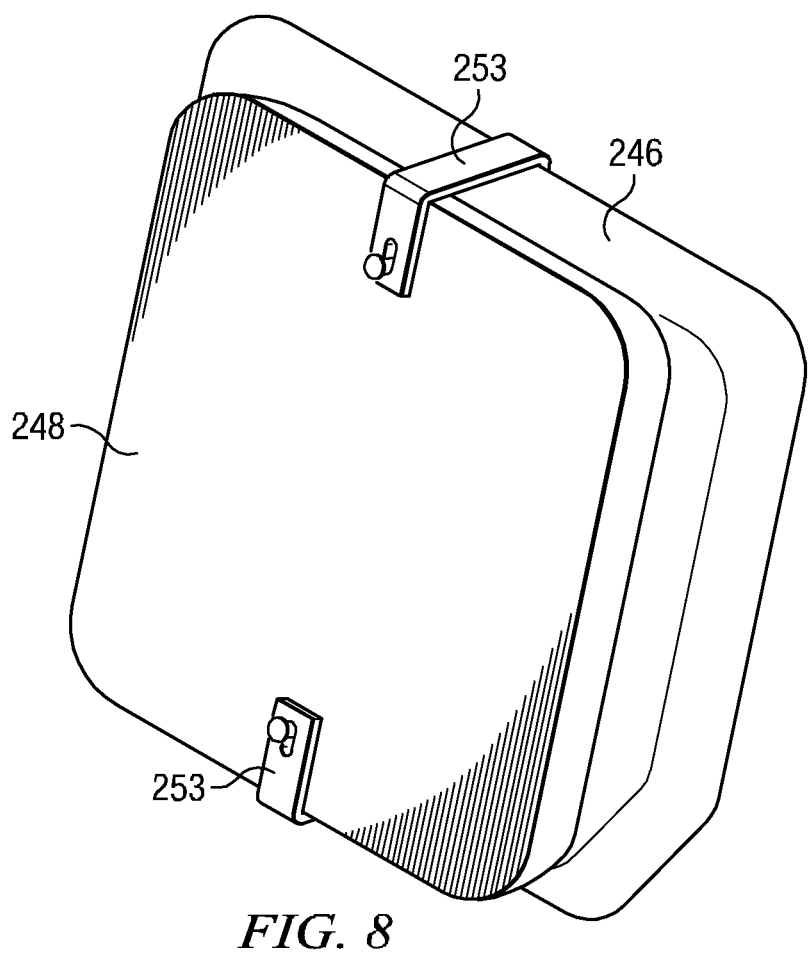
FIG. 8 is an enlarged view depicting an upper back support and a lower back support of a left rear seat, according to another embodiment, apart from the rest of the vehicle and removably coupled together.

Referring now to FIG. 8, an upper back support 246 and lower back support 248 are illustrated according to another embodiment. The upper and lower back supports 246, 248 can be similar to, or the same in many respects to the upper and lower back supports 46, 48, respectively, shown in FIGS. 1-6. The upper and lower back supports 246, 248, however, can be removably coupled together without use of a back support hinge (e.g., 50, 150). In such an embodiment, the lower back support 248 can be releasably coupled to the upper back support 246 in the stored position with a pair of straps 253. The straps 253 can be similar in many respects to the strap 53 illustrated in FIGS. 2-4. The straps 253 can be selectively released and the lower back support 248 can be moved (e.g., manually) between the passenger support position and the stored position. The lower back support 248 can be releasably secured in the passenger support position using the straps 253, using latches, or using any of a variety of alternative releasable fastening arrangements. It will be appreciated that a lower back support can be movably coupled with an upper back support in any of a variety of suitable alternative arrangements.

It will be appreciated, that although the embodiment of FIGS. 1-6 illustrates forward facing rear seats which are disposed towards a front most portion of the utility bed 20, rear seats can be provided on a utility bed in any of a variety of suitable alternative arrangements. In one embodiment, left and right rear seats can comprise rearward facing seats. In such an embodiment, the left and right side walls may or may not include respective left and right side doors since the rear seats can be accessed from the rear of the utility vehicle.

Although the embodiments above have been described with respect to individual left and right rear seats, it will be appreciated that in other embodiments the utility bed can include more than two seats or less than two seats. In yet another embodiment, the utility bed can provide a bench-type rear seat.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
   a vehicular frame; and
   a utility bed coupled with the vehicular frame and comprising:
      a bed frame; and
      a seat comprising a seat bottom and a seat back, the seat back being movable between a stowed position and a deployed position and comprising:
         a cover panel;
         an upper back support coupled with the cover panel; and
         a lower back support movably coupled with the upper back support and movable between a passenger support position and a stored position;
      wherein movement of the lower back support to the stored position reveals a space adjacent to the upper back support that is occupied by the seat bottom when the seat back is moved to the stowed position and wherein the cover panel overlies the seat bottom when the seat back is in the stowed position.

2. The vehicle of claim 1 wherein the lower back support is pivotally coupled with the upper back support and is pivotable with respect to the upper back support between the passenger support position and the stored position.

3. The vehicle of claim 2 wherein the seat further comprises a strap that is configured to releasably secure the lower back support of the seat back in the stored position.

4. The vehicle of claim 2 wherein the seat further comprises a double hinge that facilitates pivotal coupling of the lower back support with respect to the upper back support.

5. The vehicle of claim 1 wherein the lower back support of the seat back is removably coupled with the upper back support.

6. The vehicle of claim 5 wherein the seat further comprises a pair of straps that are configured to releasably secure the lower back support in the stored position.

7. A vehicle comprising:
   a vehicular frame; and
   a utility bed coupled with the vehicular frame and comprising:
      a bed frame; and a seat comprising a seat bottom and a seat back, the seat back being movable between a stowed position and a deployed position and comprising:
    an upper back support; and
    a lower back support movably coupled with the upper back support and movable between a passenger support position and a stored position;
wherein movement of the lower back support to the stored position reveals a space adjacent to the upper back support that is occupied by the seat bottom when the seat back is moved to the stowed position, and wherein the seat back comprises a cover panel and a seat back frame, the seat back frame includes upright members, the cover panel is supported by the seat back frame, and the space adjacent to the upper back support extends at least partially between the upright members of the seat back frame.

8. The vehicle of claim 7 wherein the utility bed further comprises a bed floor adjacent to the seat and, when the seat back is in the stowed position, the cover panel cooperates with the bed floor to define a cargo support surface.

9. The vehicle of claim 1 wherein the seat back is pivotally coupled to the seat bottom and is pivotable between the stowed position and the deployed position.

10. The vehicle of claim 1 wherein the utility bed further comprises:
    a left side wall;
    a left door that is pivotally coupled with the left side wall and is pivotable between an opened position and a closed position;
    a right side wall; and
    a right door that is pivotally coupled with the right side wall and is pivotable between an opened position and a closed position.

11. The vehicle of claim 10 wherein each of the left door and the right door is pivotable towards a rear of the utility bed into respective opened positions.

12. A vehicle comprising:
    a vehicular frame; and
    a utility bed coupled with the vehicular frame and comprising:
        a bed frame; and
        a seat comprising a seat bottom and a seat back, the seat back being movable between a stowed position and a deployed position and comprising:
            an upper back support, the seat back defining a space adjacent to the upper back support; and
            a lower back support pivotally coupled with the upper back support and pivotable between a passenger support position and a stored position;
    wherein, when the lower back support is pivoted from the passenger support position into the stored position, the lower back support moves upwardly and away from the seat bottom.

13. The vehicle of claim 12 wherein movement of the lower back support to the stored position reveals a space adjacent to the upper back support that is occupied by the seat bottom when the seat back is moved to the stowed position.

14. The vehicle of claim 12 wherein the utility bed further comprises:
    a left side wall;
    a left door that is pivotally coupled with the left side wall and is pivotable between an opened position and a closed position;
    a right side wall; and
    a right door that is pivotally coupled with the right side wall and is pivotable between an opened position and a closed position.

15. The vehicle of claim 14 wherein the bed frame includes a left foot portion and a right foot portion that cooperate to at least partially define a foot well, the left foot portion and the right foot portion being substantially U-shaped to provide access to the foot well.

16. The vehicle of claim 15 wherein the left door and the right door each comprise a respective lower wing portion that is configured to conceal the respective left foot portion and right foot portion when the left door and the right door are in their closed positions.

17. A vehicle comprising:
    a vehicular frame; and
    a utility bed coupled with the vehicular frame and comprising:
        a bed frame;
        a left seat comprising a left seat bottom and a left seat back, the left seat bottom being rigidly affixed to at least one of the vehicular frame and the bed frame, the left seat back being pivotally coupled to the left seat bottom and pivotable between a stowed position and a deployed position, the left seat back comprising:
            a left upper back support; and
            a left lower back support pivotally coupled with the left upper back support and pivotable between a passenger support position and a stored position;
        a right seat comprising a right seat bottom and a right seat back, the right seat bottom being rigidly affixed to at least one of the vehicular frame and the bed frame, the right seat back being pivotally coupled to the right seat bottom and pivotable between a stowed position and a deployed position, the right seat back comprising:
            a right upper back support; and
            a right lower back support pivotally coupled with the right upper back support and pivotable between a passenger support position and a stored position;
        a left side wall;
        a left door that is pivotally coupled with the bed frame and is pivotable between an opened position and a closed position;
        a right side wall; and
        a right door that is pivotally coupled with the bed frame and is pivotable between an opened position and a closed position;
    wherein movement of the left lower back support to the stored position reveals a space adjacent to the left upper back support that is occupied by the left seat bottom when the left seat back is moved to the stowed position and movement of the right lower back support to the stored position reveals a space adjacent to the right upper back support that is occupied by the right seat bottom when the right seat back is moved to the stowed position.

18. The vehicle of claim 17 wherein the bed frame includes a left foot portion and a right foot portion that cooperate to at least partially define a foot well, the left foot portion and the right foot portion being substantially U-shaped to provide access to the foot well.

19. The vehicle of claim 17 wherein the left door is pivotally coupled with the left side wall and the right door is pivotally coupled with the right side wall.

20. A vehicle comprising:
    a vehicular frame; and
    a utility bed coupled with the vehicular frame and comprising:

a bed frame;
a left seat comprising a left seat bottom and a left seat back, the left seat back being pivotally coupled to the left seat bottom and pivotable between a stowed position and a deployed position, the left seat back comprising:
  a left upper back support; and
  a left lower back support pivotally coupled with the left upper back support and pivotable between a passenger support position and a stored position;
a right seat comprising a right seat bottom and a right seat back, the right seat back being pivotally coupled to the right seat bottom and pivotable between a stowed position and a deployed position, the right seat back comprising:
  a right upper back support; and
  a right lower back support pivotally coupled with the right upper back support and pivotable between a passenger support position and a stored position;
a left side wall;
a left door that is pivotally coupled with the bed frame and is pivotable between an opened position and a closed position;
a right side wall; and
a right door that is pivotally coupled with the bed frame and is pivotable between an opened position and a closed position;
wherein movement of the left lower back support to the stored position reveals a space adjacent to the left upper back support that is occupied by the left seat bottom when the left seat back is moved to the stowed position and movement of the right lower back support to the stored position reveals a space adjacent to the right upper back support that is occupied by the right seat bottom when the right seat back is moved to the stowed position, and wherein the left seat back and the right seat back are independently pivotable between their respective deployed and stowed positions.

* * * * *